United States Patent [19]

Somlyody

[11] 4,168,088
[45] Sep. 18, 1979

[54] PROTECTED DOCUMENT AND METHOD OF MAKING THE SAME

[75] Inventor: Arpad Somlyody, Somerville, N.J.

[73] Assignee: Burroughs Corporation, Detroit, Mich.

[21] Appl. No.: 861,060

[22] Filed: Dec. 15, 1977

[51] Int. Cl.² .............................................. B42D 15/00
[52] U.S. Cl. .................................................... 283/8 R
[58] Field of Search ................... 283/6, 8 R, 8 A, 8 B, 283/9 R, 9 A

[56] References Cited

U.S. PATENT DOCUMENTS

| | | | |
|---|---|---|---|
| 3,282,720 | 11/1966 | Oleksiw | 283/8 R X |
| 3,675,948 | 7/1972 | Wicker | 283/8 B X |
| 4,033,059 | 7/1977 | Hutton et al. | 283/8 B X |
| 4,066,280 | 1/1978 | LaCapria | 283/8 R |

Primary Examiner—Travis S. McGehee
Attorney, Agent, or Firm—Lynn L. Augspurger; Kevin R. Peterson; Edward J. Feeney

[57] ABSTRACT

Disclosed is a document which is made secure from illegal copying by color copiers. The invention comprises including in the printed document a warning word of phrase which is made up of picture elements which are less dense than its surrounding background, but the density changes gradually and not sharply with respect to the surrounding background density.

3 Claims, 3 Drawing Figures

PROTECTED DOCUMENT AND METHOD OF MAKING THE SAME

BACKGROUND OF THE INVENTION

In the prior art, there are many ways of making a document safe from alteration. Prior art techniques, for the most part, are based upon the utilization of chemical formulations which are or may be employed as either an overlay on the top surface of the document to be protected or as an overprinted area on such documents.

With the advent of xerographic color copiers such as the Xerox L-6500 color copier or similar machines, the problem of nefarious reproductions has dramatically increased. The quality of the color reproduction at this point in the art is such that it is very difficult, often impossible, to discern whether the copied document is the original or a color copy. The reproduction of checks, stock certificates, automobile title instruments, etc., can be readily accomplished.

In copending application Ser. No. 766,590, filed Feb. 8, 1977, entitled "Protection System for Documents," incorporated herein fully by reference, there has been disclosed a system for protection of documents which employs a masked warning mark which, when copied, appears on the copy due to its effective color density being above the color reproductive threshold density of the copier.

In another copending application, Ser. No. 809,261, filed June 23, 1977, for "Protected Document Bearing Watermark and Method of Making Same," which is incorporated herein by reference, another method for protecting documents is disclosed. This latter application employs a cancellation phrase pattern of two or more different screen tones.

The inventions described and claimed in these applications operate satisfactorily. The present application describes and claims still other methods of making documents secure.

DESCRIPTION OF THE PREFERRED EMBODIMENTS

Figure 1:
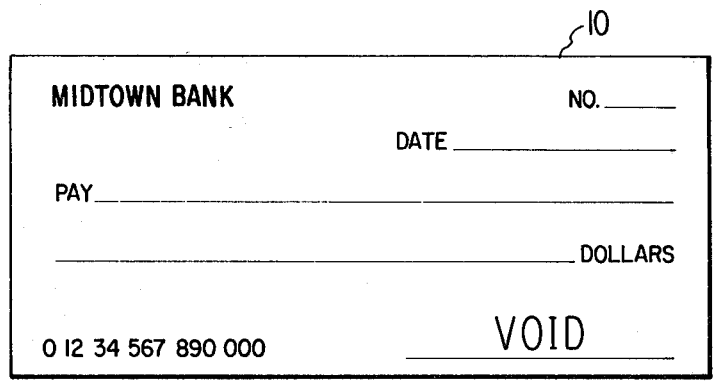
FIG. 1 is a plan view of a document bearing a protective word.

Referring to FIG. 1, there is shown a document 10, e.g., check, stock certificate, or the like showing the protective word "VOID" imprinted on its surface. Of course, in actuality, the word would not be visible to the naked eye.

Figure 2:
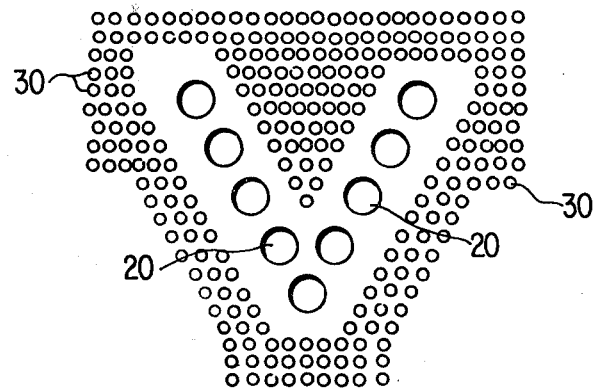
FIG. 2 is a magnified view of the document of FIG. 1 showing a portion of the printed structure of the protective word and background of the document.

According to the invention, the background appearing on the surface of the document and the protective word "VOID" are made up of dots which are circular, square, or other shapes of colored print, preferably all of the same color. For purposes of illustration, it is assumed that circular dots are employed. The protective word "VOID" is formed of dots 20 having a density of, for example, 65 mesh, which represents 65 dots to the inch, and the surrounding background is preferably made up of dots or circles 30 of 120 mesh, which represents 120 dots per inch. This is illustrated in FIG. 2. However, according to the invention and as illustrated in FIG. 3, the region between the background and protective word includes dots 40 of sizes between 65 and 120 mesh so that there is a graduated dot size between the background and the protective word.

Those skilled in the art can readily prepare the printing apparatus required to prepare the document described above, and such preparation need not be described in detail herein.

Figure 3:
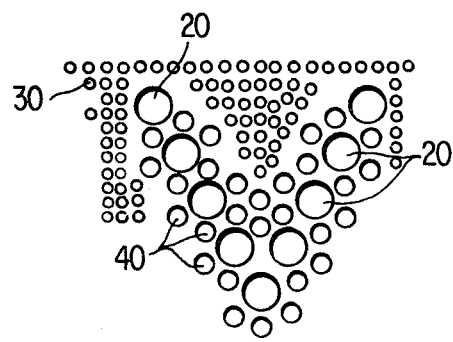
FIG. 3 is a magnified view, similar to that of FIG. 2, illustrating the invention.

It is noted that, in a document prepared as described and as illustrated in FIG. 3, the protective word "VOID" will not be visible to the naked eye; however, the difference in density or dot size between the word and the background will be detectable by a copying machine, and the word "VOID" will appear clearly in any copies made of the document.

Various modifications in the invention will occur to those skilled in the art, and, in one such modification, the densities or dot sizes described above could be reversed, with the protective word being of smaller dot size than the background.

What is claimed is:

1. A document for preventing unauthorized copying comprising a substrate having a top surface for carrying indicia;

background printed matter on said top surface made up of small areas of substantially the same size and shape; and a warning word printed on said top surface and blended with said background printed matter, said warning word being made up of small areas of substantially the same shape as said background but of a different size such that the warning word cannot be detected by a viewer, but will be visible upon reproduction by a copying machine;

the printed matter present between the areas of said word and said background being of substantially the same shape as the areas of said word and background but being of different sizes between the size of the word areas and the size of the background areas, and wherein the printed matter present between the areas of the word and said background is comprised of dots of sizes between 65 and 120 mesh so that there is a graduated dot size between the background and the word.

2. The document defined in claim 1 wherein the printed areas of said warning word are smaller than the printed areas of said background.

3. The document defined in claim 1 wherein the printed areas of said warning word are larger than the printed areas of said background.

* * * * *